United States Patent

Stewart et al.

[11] 4,227,488
[45] Oct. 14, 1980

[54] FLUIDIZED BED UNIT INCLUDING A COOLING DEVICE FOR BED MATERIAL

[75] Inventors: Robert D. Stewart, Verona; Robert L. Gamble, Wayne, both of N.J.

[73] Assignee: Foster Wheeler Energy Corporation, Livingston, N.J.

[21] Appl. No.: 948,265

[22] Filed: Oct. 3, 1978

[51] Int. Cl.³ ............................................. F22B 1/02
[52] U.S. Cl. ................................. 122/4 D; 110/245; 431/7; 431/170
[58] Field of Search ............... 122/4 D; 110/245, 263, 110/165 R; 431/7, 170

[56] References Cited

U.S. PATENT DOCUMENTS

| | | | |
|---|---|---|---|
| 2,638,684 | 5/1953 | Jukkola | 34/9 |
| 2,686,113 | 8/1954 | Odell | 48/206 |
| 2,700,592 | 1/1955 | Heath | 423/571 |
| 3,577,939 | 5/1971 | Muirhead | 110/245 |
| 3,823,693 | 7/1974 | Bryers et al. | 122/4 D |
| 3,841,240 | 10/1974 | Wentworth et al. | 110/245 X |
| 3,910,208 | 10/1975 | Albrecht et al. | 110/245 |
| 4,023,280 | 5/1977 | Sehora et al. | 110/164 R X |
| 4,085,707 | 4/1978 | Moss | 122/4 D |

FOREIGN PATENT DOCUMENTS 1166675 10/1969 United Kingdom ............... 110/245

*Primary Examiner*—Edward G. Favors
*Attorney, Agent, or Firm*—Marvin A. Naigur; John E. Wilson; John J. Herguth, Jr.

[57] ABSTRACT

A fluidized bed combustion or gasification unit in which a grate is disposed in a housing to divide the housing into an upper chamber and a lower chamber. A bed of particulate material including burning fuel is supported by the grate and extends in the upper chamber. The lower chamber has an inlet for receiving pressurized air for passing through the lower chamber, the grate, and the bed of particulate material to fluidize the particulate material. A cooling device is provided for receiving the particulate material from the bed and cooling same prior to the material being discharged to external equipment.

29 Claims, 6 Drawing Figures

FLUIDIZED BED UNIT INCLUDING A COOLING DEVICE FOR BED MATERIAL

BACKGROUND OF THE INVENTION

The present invention relates to a fluidized bed unit and a method for operating same in which material removed from the bed is cooled before being passed to external equipment.

The use of fluidized beds has been recognized as an attractive means of generating heat. In these arrangements, a bed of particulate material is provided which normally consists of a mixture of inert material, a fossil fuel such as coal, and an adsorbent for the sulfur formed during the combustion of the fuel. Air is passed through the bed to fluidize the bed and to promote the combustion of the fuel. When the heat produced by the fluidized bed is utilized to convert water to steam, such as in a steam generator, a reactor, or the like, the fluidized bed offers an attractive combination of high heat release, improved heat transfer to surfaces within the bed, and compact size.

During the operation of these units new adsorbent material, usually limestone, must be continuously introduced into the bed to insure the existence of an adequate supply to maintain desired sulfur emissions control, and spent material, which may include ash from combusted fuel, must be continuously withdrawn from the bed to maintain a desired bed inventory or consistency. However, the withdrawal of material from the bed presents problems. For example, the removed material is at a very high temperature, such as 1300° F. to 2100° F., and, since it is usually passed to external materials handling equipment such as auger blades, or other rotary devices, the latter are easily damaged due to the high temperatures and pressure differentials involved. This of course requires frequent replacement of the equipment and/or the use of expensive components which are less immune to deterioration with the high temperatures. Also the removed bed material may contain incompletely reacted fuel residues and/or environmentally unstable products such as alkali sulfides, as well as unreacted chemicals such as lime, or the like, for use in adsorbing the sulfur generated during the burning process. As a result of this, plus the fact that the bed material is at a very high temperature as discussed above, the removal of the material will result in a considerable loss of heat and unreacted bed material from the process.

SUMMARY OF THE INVENTION

It is therefore an object of the present invention to provide a fluidized bed apparatus and a method for operating same in which the material withdrawn from the main fluidized bed is cooled prior to being exposed to any external materials handling equipment.

It is also an object of the present invention to provide an apparatus and method of the above type in which a cooling fluid is passed through the bed material after it has been withdrawn from the bed and before it is discharged to external materials handling equipment.

It is a still further object of the present invention to provide an apparatus and method of the above type in which an additional enclosure is provided in communication with the fluidized bed for receiving the discharged bed material, and a grate is disposed in the additional enclosure for permitting ambient air to pass through the latter enclosure for cooling the material.

Towards the fulfillment of these and other objects, the apparatus of the present invention comprises a grate disposed in a housing for dividing the housing into an upper chamber and a lower chamber. A bed of particulate material including fuel is supported by the grate and extends in the upper chamber. The lower chamber has an inlet for receiving pressurized air for passing through the lower chamber, the grate and the bed of particulate material to fluidize the particulate material. An enclosure is provided which has an inlet communicating with the bed for receiving particulate material from the bed and an outlet for discharging the particulate material to external apparatus. An additional grate is disposed in the enclosure over which the particulate material passes, and a cooling fluid is passed through the additional grate and the particulate material in the enclosure to cool the material.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings wherein.

DESCRIPTION OF THE PREFERRED EMBODIMENTS

Figure 1:
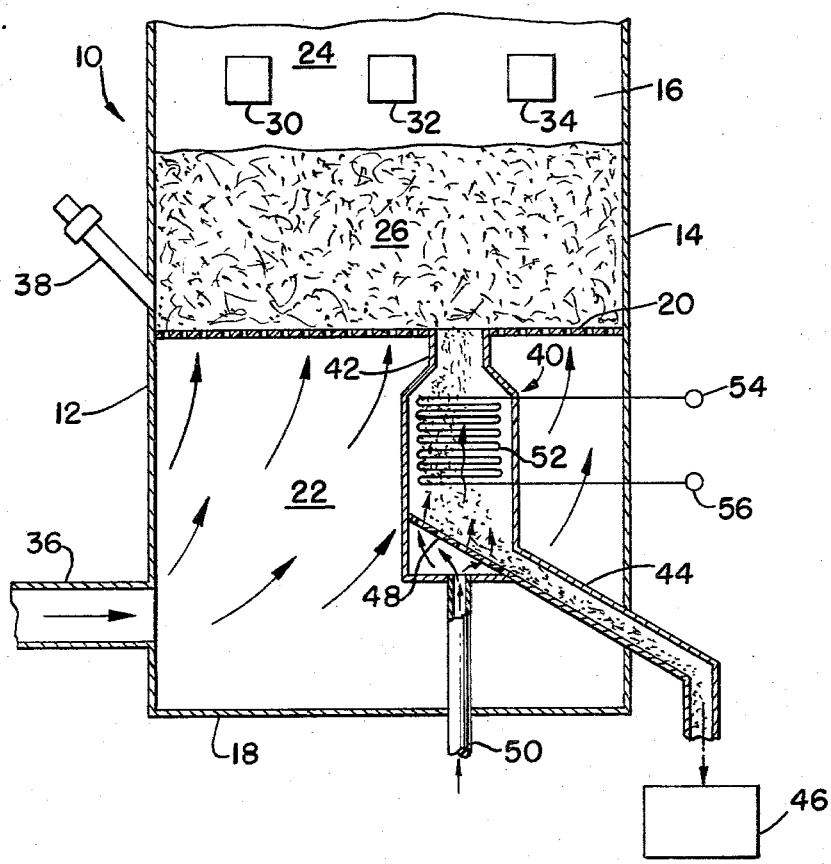
FIG. 1 is a schematic sectional view depicting a portion of a fluidized bed unit employing features of the present invention.

Referring specifically to the embodiment of FIG. 1, the reference numeral 10 refers in general to a fluidized bed unit which can be in the form of a boiler, a reactor, a steam generator, or the like. The unit 10 includes a front wall 12, a rear wall 14, a pair of sidewalls, one of which is shown by the reference numeral 16, and a floor 18. The upper portion of the unit 10 is not shown for the convenience of presentation it being understood that it consists of a convection section, a roof and an outlet for allowing the combustion gases to discharge from the unit in a conventional manner.

A horizontally extending fluid distributor plate, or grate, 20 extends between the walls 12, 14, and 16 and above the floor 18 to define a lower chamber 22 extending below the grate and an upper chamber 24 extending above the grate.

A bed of particulate material, shown in general by the reference numeral 26, is disposed in the upper chamber 24 and is supported by the grate 20. The bed of particulate material includes a mixture of crushed coal and an inert material such as commercial grade hematite iron ore or sand. Also, limestone or dolomite can be included for use as an adsorbent bed material for the sulfur compounds formed during the combustion of the fuel.

Three feeders 30, 32, and 34 in the form of spreaders, or the like, are mounted relative to the sidewall 16 shown in FIG. 1, above the level of the bed 26 for introducing the particulate fuel material into the chamber 24 and the bed. It is understood that the feeders can, alternately, be mounted below the level of the bed 26 and be in the form of pipes for providing an in-bed feed of the particulate material. It is also understood that separate feeders (not shown) for the introduction of adsorbent material into the bed 26 are provided as needed.

The front wall 12 is provided with an inlet duct 36 which communicates with the lower chamber 22 and which is connected to a pressurized source (not shown) of fluid, such as air, for introducing the air into the lower chamber. Although not shown in the drawings it is understood that a damper, or the like, may be associated with the air inlet duct 36 to control the flow of air into the chamber 22.

An ignitor 38 is mounted relative to the front wall 12 immediately above the grate 20 and is adapted to ignite the particulate fuel material in the bed 26 during startup fluidization, in a conventional manner.

An enclosure, shown in general by the reference numeral 40, is disposed in the lower chamber 22 and includes an inlet 42 extending through an appropriately formed opening in the grate 20 for receiving the material from the bed 26, and an outlet conduit 44 extending from the lower portion of the enclosure, through the rear wall 14 and externally of the latter wall. Alternately, the outlet conduit 44 may be routed through the floor 18. The outlet conduit 44 is connected to materials handling equipment, shown generally and schematically by the reference numeral 46, which receives the material from the conduit 44 and passes same to external equipment for further treating, cleaning, regeneration, and/or recycling as needed. Since the materials handling equipment 46 can be of a conventional design it will not be described in any further detail.

A fluid distribution plate, or grate, 48 is disposed in the lower portion of the enclosure 40 and extends angularly from the floor of the enclosure to the front wall thereof. As a result, the material flowing through the enclosure 40 passes over the grate 48 before discharging from the enclosure and into the duct 44. An air inlet pipe 50 extends from a point below the floor 18 of the unit 10, through a portion of the lower chamber 22 and communicates with the floor of the enclosure 40. The inlet pipe 50 is connected to a pressurized air source (not shown) for introducing air into the enclosure whereupon the air passes upwardly through the grate 48 and through the material passing through the enclosure 40.

A series of cooling tubes, shown in general by the reference numeral 52, are provided, with each tube having one end connected to an inlet header 54 located immediately adjacent the rear wall 14 and externally thereof. The tubes 52 extend into the enclosure 40 where they are formed in a serpentine relationship, and an external header 56 is provided adjacent the header 54 and is connected to the other ends of the tubes 52. As a result, a cooling liquid, such as water, can be passed from the header 54, into the tubes 52 in a heat exchange relation to the material passing through the enclosure 40, and then to the header 56 for passage to external equipment such as an economizer, a preheater, or the like.

Although not shown in the drawing, it is understood that associated equipment such as heat exchange tubes passing through the bed 26 or forming portions of the walls 12, 14, and 16 can be provided to transfer the heat generated by the bed 26 to a fluid, such as water, with the particular arrangement depending on the specific function of the unit 10.

In operation, air is introduced into the inlet duct 36 and passes into and through the lower chamber 22, the grate 20, and the fluidized bed 26 before exiting out the upper portion of the unit 10. The ignitor 38 is activated to apply heat to the fuel material in the bed 26 and may be deactivated as soon as the latter reaches ignition temperature. Additional particulate fuel material is introduced to the bed 26 via the feeders 30, 32, and 34, as needed and will ignite from the heat produced by the bed.

A portion of the bed material, including spent fuel and adsorbent material, is withdrawn by gravity through the opening in the grate 20, and passes into and through the inlet 42 of the enclosure 40 whereby it flows downwardly through the latter enclosure. Air from the inlet pipe 50 passes upwardly through the grate 48 in the enclosure 40 and through the length of the enclosure to cool the material passing through the enclosure before the latter is discharged through the conduit 44 and to the materials handling equipment 46. The air passing upwardly through the enclosure 40 passes through the opening in the grate 20 and upwardly into the bed 26 for returning the heat extracted from the material in the enclosure 40 to the material remaining in the bed 26.

Cooling liquid, such as water, may be passed through the enclosure 40 via the inlet header 54, the cooling tubes 52 and the header 56, to further cool the material passing through the enclosure 40. As mentioned above the cool material from the materials handling equipment 46 and the hot liquid from the header 56 can be treated further and/or used in related processes, as needed.

Figure 2:
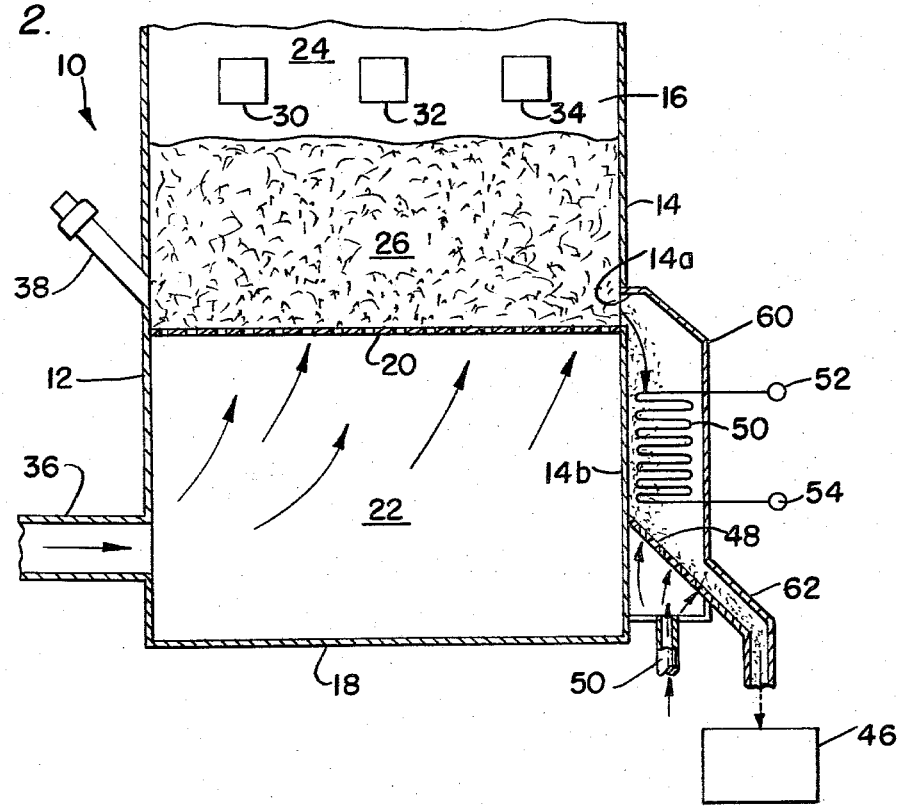
FIGS. 2-4 are views similar to FIG. 1 but depicting alternate embodiments of the present invention.

FIG. 2 depicts an alternate embodiment of the present invention and since the unit shown is similar in many respects to the unit of the embodiment of FIG. 1 components that are identical to components in the embodiment of FIG. 1 are referred to by the same reference numerals and will not be described in any further detail. In particular, the fluidized bed unit of the embodiment of FIG. 2 is identical to that of the embodiment of FIG. 1 with the exception that the opening through the grate 20 is eliminated and an opening 14a is provided in the rear wall 14 immediately above the grate 20 which communicates with an enclosure 60 mounted relative to the outer surface of the rear wall 14.

The enclosure 60 includes a grate 48, an air inlet pipe 50, and a series of tubes 52 extending between an inlet header 54 and an outlet header 56, in a manner similar to that of the embodiment of FIG. 1. The enclosure 60 also includes a discharge conduit 62 which is similar in design to the conduit 44 of the previous embodiment with the exceptions that it is located outside of chamber 22 and is capable of transferring heat directly to that portion of the rear wall 14 partly enclosing chamber 22.

In the operation of the embodiment of FIG. 2, the material from the bed 26 discharges through the opening provided in the rear wall 14 and into the enclosure 60 where it is cooled by the air passing through the grate 48 and upwardly through the enclosure before it is discharged into the materials handling equipment 46. The material can be further cooled by a liquid circulating through the tubes 52 and the headers 54 and 56.

The air passing through the enclosure 60 passes through the opening in the rear wall 14 and into the bed 26 for adding the heat extracted from the material in the enclosure 60 to the material in the bed 26.

Figure 3:
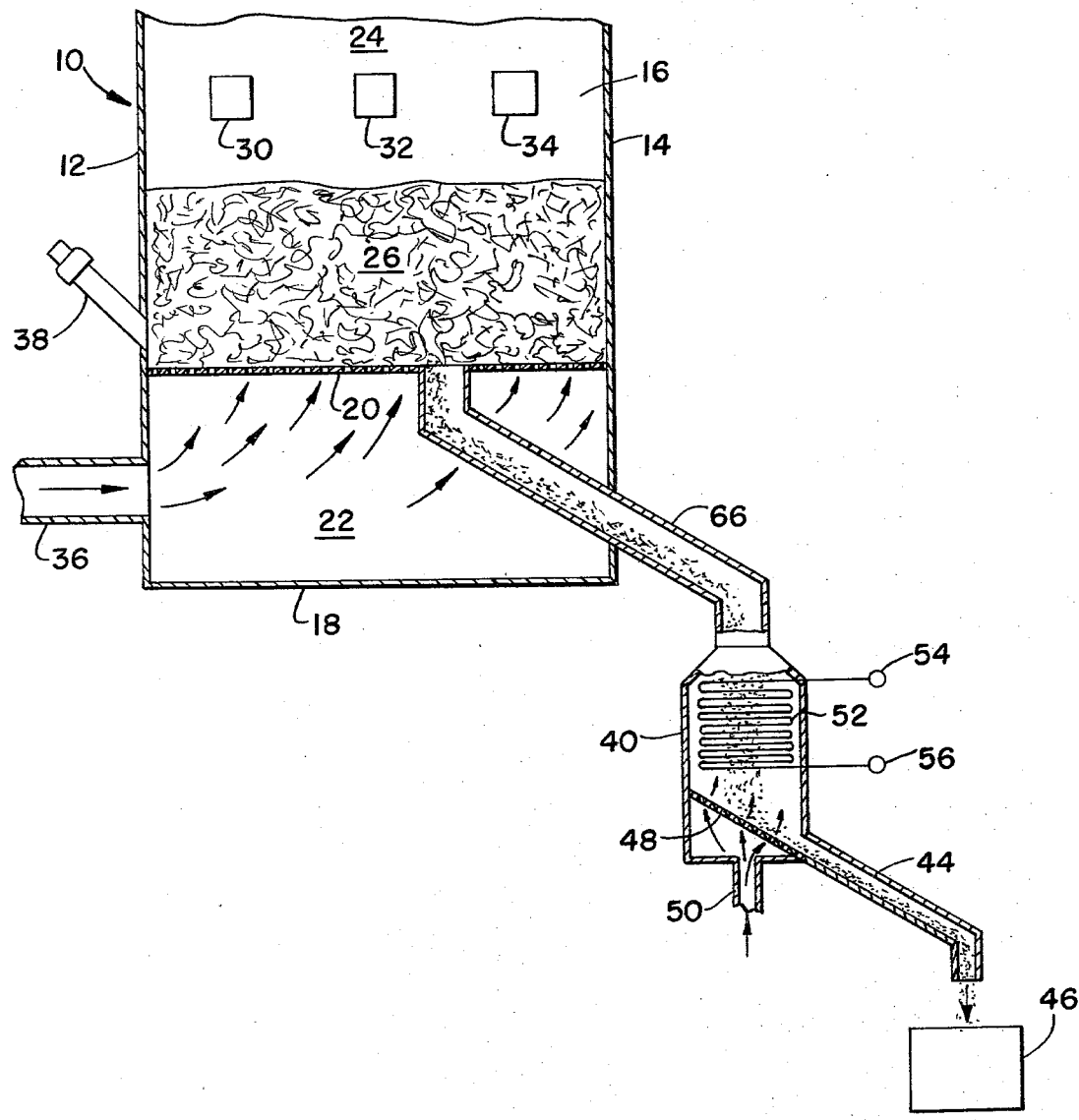

The embodiment of FIG. 3 is identical to that of FIG. 1 with the exception that an elongated inlet duct 66 is provided which communicates at one end with an opening formed in the grate 20 of the unit 10 and extends externally of the latter unit. The other end of the duct 66 is connected to an enclosure 40 which is identical to the enclosure 40 of the embodiment of FIG. 1. Therefore, the operation of the embodiment of FIG. 3 is similar to that of FIG. 1 with the exception that a portion of the particulate material from the bed 26 passes externally of the unit 10 via the duct 66 and into the enclosure 40 for the treatment described in connection with the previous embodiments.

Figure 4:
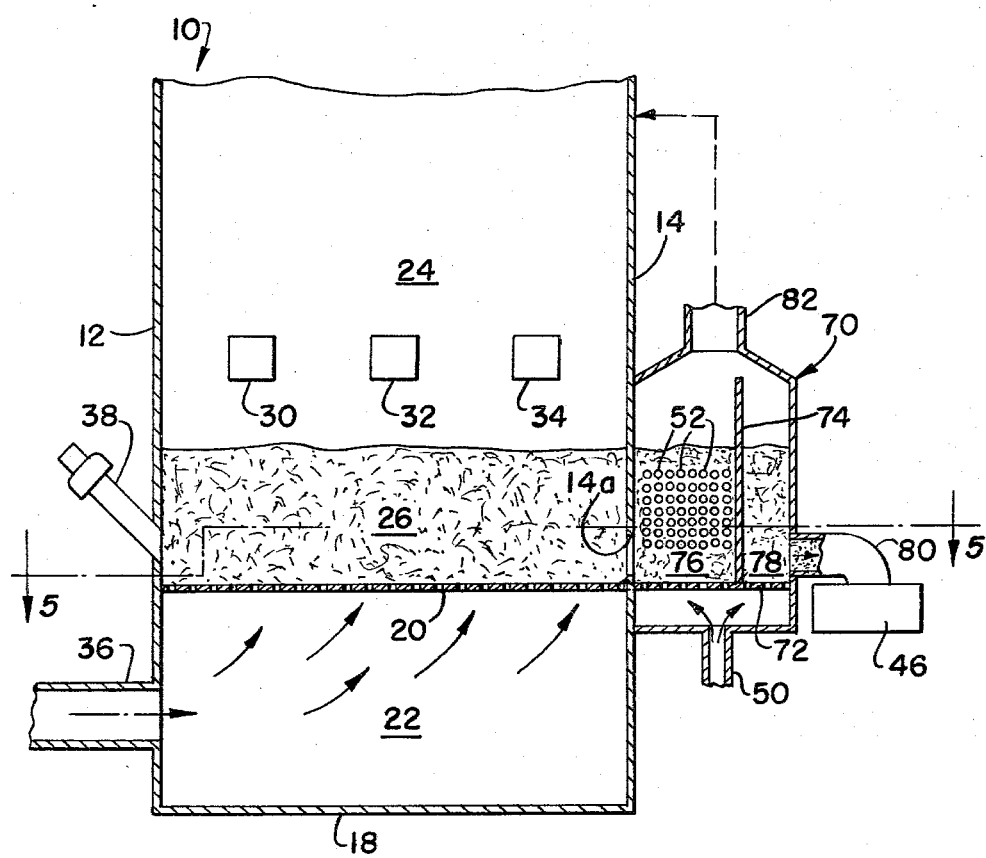
Figure 5:
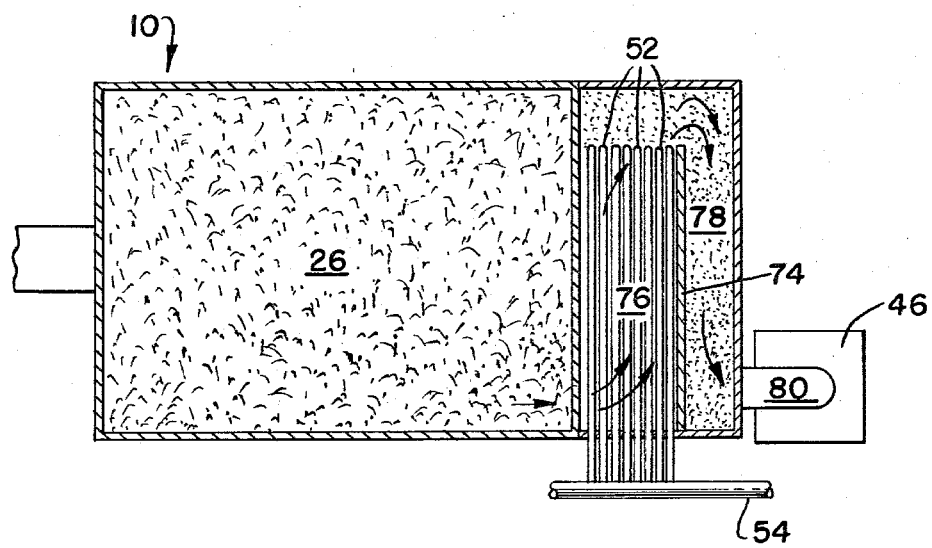
FIG. 5 is a sectional view taken along the line 5—5 of FIG. 4.

In the embodiment of FIGS. 4 and 5, an enclosure 70 is provided immediately adjacent the rear wall 14 of the unit 10 and includes a fluid distribution plate, or grate, 72 which extends horizontally and in line with or slightly below the grate 20 of the unit 10. The enclosure 70 communicates with the upper chamber 24 of the unit 10 via an opening 14a formed in the rear wall 14 immediately above the grates 20 and 72 to permit the material from the bed 26 to pass into the enclosure 70.

A partition 74 is provided in the enclosure 70 to divide same into a chamber 76 communicating with the bed 26 and a chamber 78 which communicates with a discharge conduit 80 extending through an opening formed in the rear wall of the enclosure 70. As shown in FIG. 5, the partition 74 extends from one sidewall 16 of the enclosure 70 to a position which is spaced from the other sidewall 16 of the enclosure to permit the materials from the chamber 76 to pass into and through the chamber 78 before discharging through the discharge conduit 80. The discharge conduit 80 is connected to materials handling equipment 46 for discharging the bed materials from the chamber 78 to the equipment 46.

A liquid circulation system is provided which includes a plurality of tubes 52 connected at their ends to an inlet header 54 and an outlet header (not shown). The tubes 52 extend in the chamber 76 in a serpentine fashion and the header 54 is located adjacent the sidewall of the enclosure 70 as shown in FIG. 5, it being understood that the outlet header 56 is provided immediately below the header 54. An air inlet pipe 50 extends through the floor of the enclosure 70 for supplying air to the enclosure.

In the operation of the embodiment of FIGS. 4 and 5, air is passed into the enclosure 70 from the inlet pipe 50 whereby it passes through both chambers 76 and 78 to fluidize and cool the material therein which is received from the bed 26. The enclosure 70 includes an outlet 82 at its upper portion for routing the heated air to an appropriate point for heat recovery.

The air and the cooling liquid passing through the chamber 76 reduces the temperature of the bed materials an incremental amount, such as from approximately 1500° F. to approximately 600° F., before the material passes to the chamber 78. In the chamber 78 the material is cooled another increment, such as to 300° F., by the air passing upwardly therethrough.

Figure 6:
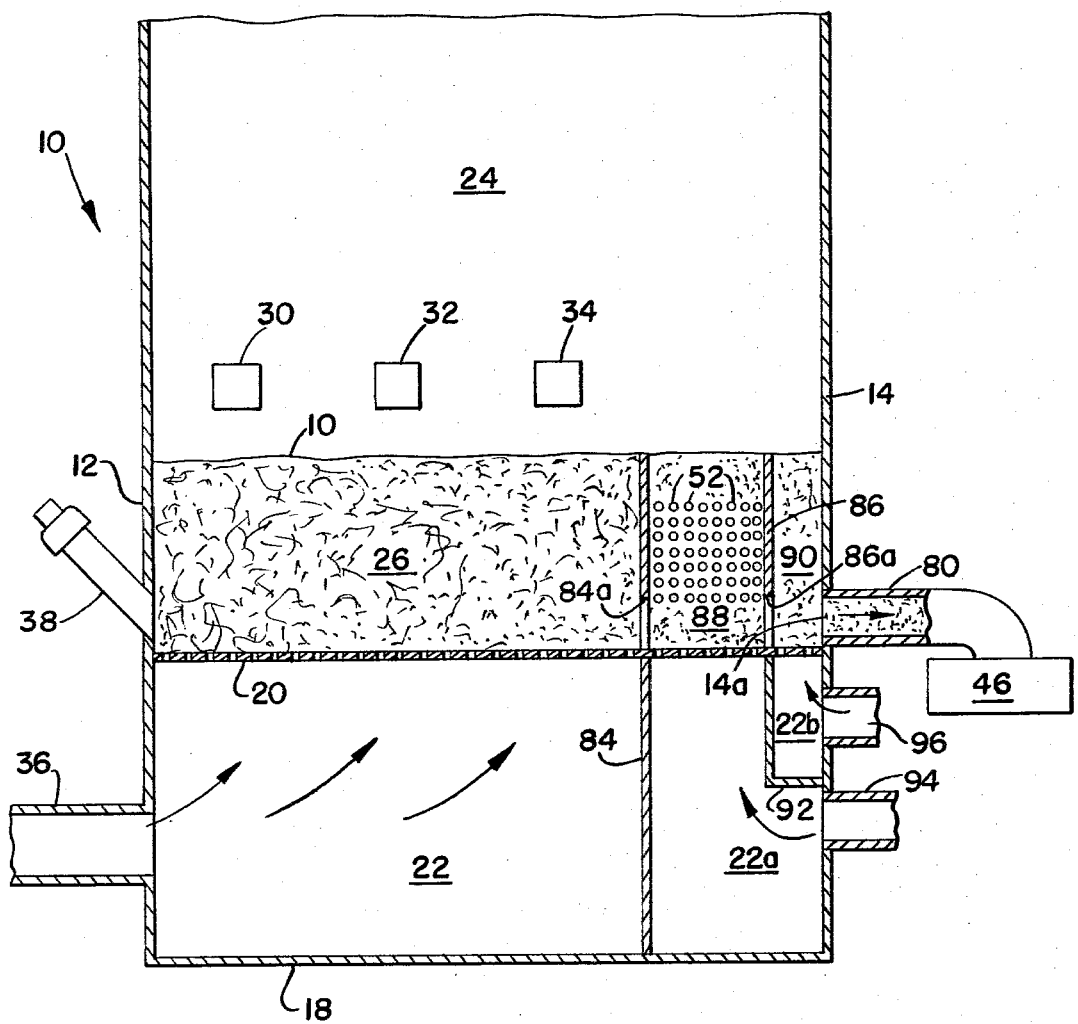
FIG. 6 is an enlarged view, similar to FIGS. 1-4, depicting another alternative embodiment of the present invention.

The embodiment of FIG. 6 is identical to that of the embodiment of FIGS. 4 and 5 with the exception that a cooling unit, similar to the cooling unit of the latter embodiment is mounted within the fluidized bed unit 10. In particular, a partition 84 extends parallel to the front wall 12 and the rear wall 14 and extends from the floor 18 to a level in the upper chamber 24 substantially corresponding to the level of the bed 26. A second partition 86 extends parallel to the partition 84 from an intermediate level in the lower chamber 22 to the level of the bed 26 in the upper chamber 24. The partitions 84 and 86 extend to the two sidewalls 16 of the unit 10 and thus define two chambers 88 and 90 extending immediately above the grate 20 and adjacent the upper chamber 26.

The partitions 84 and 86 are provided with openings 84a and 86a, respectively located immediately above the grate 20 for permitting the bed material from the bed 26 to pass into the chamber 88 and from the latter into the chamber 90.

An opening 14a is provided in the rear wall 14 to permit the material from the chamber 90 to discharge into a discharge conduit 80 and through the latter into suitable materials handling equipment 46 as in the previous embodiment.

The lower portion of the partition 84 defines an additional air chamber 22a extending below the chamber 88 and a horizontal partition 92 connects the lower end of the partition 86 to the rear wall 14 to define an additional enclosed air chamber 22b extending below chamber 90. Two air inlet pipes 94 and 96 extend through the rear wall 14 in communication with the air chambers 22a and 22b, respectively.

A liquid circulation system, including a plurality of tubes 52 is provided in the chamber 88 and is identical to that of the previous embodiment.

In operation of the embodiment of FIG. 6, the material from the main bed 26 passes through the opening 84a in the partition 84 into the chamber 88 and, from the latter, through the opening 86a in the partition 86 and into the chamber 90. Air is passed from the inlet pipes 94 and 96 into the air chambers 22a and 22b from which it passes upwardly through the grate 20 and into the chambers 88 and 90 to fluidize and cool the bed materials contained therein.

As in the previous embodiment the air and cooling liquid in the chamber 88 cools the material in the latter chamber an incremental amount and the air passing through the chamber 90 cools the material another increment. The air discharging from the upper portion of the chambers 88 and 90 passes upwardly through the upper chamber 24 of the unit 10 and can be routed and treated in a manner identical to the air passing through the chamber 22 and the bed 26.

Several advantages result from each of the foregoing embodiments. For example, the materials withdrawn from the bed will not damage the materials handling equipment since the material is cooled prior to introduction to the latter. This rapid cooling of the material discharged from the bed may induce thermal shock and spalling of the outer reacted or dead burned shells of larger particles removed exposing more reactive material for recycling. Further, the cooling air passing through the beds in the enclosures are returned to the main bed which returns the heat to the main bed to increase the thermal efficiency.

A latitude of modification, change and substitution is intended in the foregoing disclosure and in some instances some features of this invention will be employed without a corresponding use of other features. Accordingly, it is appropriate that the appended claims be construed broadly and in a manner consistent with the spirit and scope of the invention herein.

What is claimed is:

1. A fluidized bed unit comprising a housing, a fluid distributor plate disposed in said housing and dividing said housing into an upper chamber and a lower chamber, a bed of particulate material including fuel supported by said plate and extending in said upper chamber, said lower chamber having an inlet for receiving pressurized air for passing through said lower chamber, said plate and said bed of particulate material to fluidize said particulate material, an enclosure having an inlet communicating with said bed for receiving particulate material from said bed and an outlet for discharging said particulate material to external apparatus, an additional fluid distributor plate disposed in said enclosure over which said particulate material passes, and means for passing a cooling fluid through said additional plate and said particulate material in said enclosure to cool said material.

2. The unit of claim 1, wherein said cooling fluid passes through said enclosure and into said bed of particulate material in said upper chamber.

3. The unit of claim 1, wherein said cooling fluid is in the form of ambient air.

4. The unit of claim 1, wherein said enclosure is located in said lower chamber.

5. The unit of claim 1, wherein said enclosure is located in said upper chamber and is defined by one of the walls of said housing and a partition extending upwardly from said first-mentioned fluid distributor plate and parallel to said latter wall.

6. The unit of claim 5, wherein an opening is formed in said partition to define said inlet for receiving particulate material from said bed.

7. The unit of claim 1, wherein said enclosure is located externally of said housing.

8. The unit of claim 7, wherein said enclosure is defined in part by an outer wall of said housing.

9. The unit of claim 1, wherein said enclosure includes a duct portion extending through said lower chamber and said first-mentioned fluid distributor plate and defining said inlet.

10. The unit of claim 1, further comprising means for passing a cooling liquid in a heat exchange relation to the particulate material in said enclosure.

11. The unit of claim 10, wherein said means for passing a cooling liquid comprises at least one tube extending in said enclosure and means for passing water through said tube.

12. A fluidized bed unit comprising a housing, a fluid distributor plate disposed in said housing and dividing said housing into an upper chamber and a lower chamber, a bed of particulate material including fuel supported by said plate and extending in said upper chamber, said lower chamber having an inlet for receiving pressurized air for passing through said lower chamber, said plate and said bed of particulate material to fluidize said particulate material, an enclosure for receiving a portion of the particulate material from said bed, means for passing a cooling fluid through said portion of the particulate material in the enclosure to cool said material, means for directing said cooling fluid from said enclosure into said bed of particulate material in said upper chamber, and means for passing a cooling liquid in a heat exchange relation to the particulate material in said enclosure.

13. The unit of claim 12, wherein said cooling fluid is ambient air.

14. The unit of claim 12, wherein said enclosure is located in said lower chamber.

15. The unit of claim 12, wherein said enclosure is located in said upper chamber and is defined by one of the walls of said housing and a partition extending upwardly from said plate and parallel to said latter wall.

16. The unit of claim 15, wherein an opening is formed in said partition for withdrawing a portion of the particulate matter from said bed.

17. The unit of claim 12, wherein said enclosure is located externally of said housing.

18. The unit of claim 12, wherein said enclosure is located adjacent an outer wall of said housing.

19. The unit of claim 12, wherein said enclosure includes a duct portion extending through said lower chamber and said plate and defining said inlet.

20. The unit of claim 12, wherein said means for passing a cooling liquid comprises at least one tube extending in said enclosure and means for passing water through said tube.

21. The unit of claim 12, further comprising means for passing said cooled material to external handling equipment for said material.

22. A method of operating a fluidized bed comprising the steps of supporting a bed of particulate material including fuel in a housing, passing air through said bed of particulate material to fluidize said particulate material, withdrawing a portion of the particulate material from said bed to a fluid distribution plate, and passing air through said fluid distribution plate and said withdrawn material to cool said withdrawn material.

23. The method of claim 22, further comprising the step of passing said cooled material to external handling equipment for said material.

24. The method of claim 22, wherein said air passed through said fluid distributor plate and said withdrawn material is ambient air.

25. The method of claim 22 or 24, wherein said fluid distributor plate is in an enclosure.

26. The method of claim 22 or 24, further comprising the step of passing said ambient air from said enclosure into said bed of particulate material in said housing.

27. The method of claims 24, wherein said step of cooling comprises the step of passing liquid through tubes located in a heat exchange relation to said withdrawn material.

28. The method of claim 22, wherein said portion of particulate material is withdrawn to an enclosure located externally of said housing.

29. The method of claim 22, wherein said portion of particulate material is withdrawn to an enclosure located within said housing.